(12) United States Patent
Yamamoto et al.

(10) Patent No.: US 7,200,697 B1
(45) Date of Patent: *Apr. 3, 2007

(54) HIGH SPEED DATA TRANSFER BETWEEN MAINFRAME STORAGE SYSTEMS

(75) Inventors: Akira Yamamoto, Kawasaki (JP); Kenji Yamagami, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 10/641,276

(22) Filed: Aug. 15, 2003

Related U.S. Application Data

(63) Continuation-in-part of application No. 09/774,435, filed on Jan. 30, 2001, now Pat. No. 6,748,467.

(51) Int. Cl.
*G06F 13/38* (2006.01)

(52) U.S. Cl. .................. 710/65; 710/66; 710/68; 709/213; 709/214; 709/216; 709/238

(58) Field of Classification Search .................. 710/65
See application file for complete search history.

(56) References Cited

U.S. PATENT DOCUMENTS

| | | | |
|---|---|---|---|
| 5,155,845 A | 10/1992 | Beal et al. | |
| 5,675,642 A | 10/1997 | Sone | 370/389 |
| 5,689,501 A | 11/1997 | Takase et al. | 370/244 |
| 6,014,707 A | 1/2000 | Miller et al. | 709/232 |
| 6,038,676 A * | 3/2000 | Yanes et al. | 714/1 |
| 6,098,129 A | 8/2000 | Fukuzawa et al. | |
| 6,505,273 B2 | 1/2003 | Taroda et al. | |
| 6,516,385 B1 | 2/2003 | Satoyama et al. | 711/112 |
| 6,546,012 B2 | 4/2003 | Kamo et al. | 370/395.1 |
| 6,598,129 B2 * | 7/2003 | Kanda et al. | 711/147 |
| 2002/0147886 A1 * | 10/2002 | Yanai et al. | 711/112 |
| 2003/0088732 A1 * | 5/2003 | Tadroda et al. | 711/112 |

OTHER PUBLICATIONS

"EMC Symmetrix DMX Series" www.emc.com/products/systems/DMX_series.jsp, pp. 1-5.
"Data Replication Over IP Networks" Computer Network Technology, pp. 1-8.

(Continued)

*Primary Examiner*—Fritz Fleming
*Assistant Examiner*—Niketa I. Patel
(74) *Attorney, Agent, or Firm*—Mattingly, Stanger, Malur & Brundidge, P.C.

(57) ABSTRACT

A method and apparatus for transferring data between storage systems including a first disk system for receiving first data in a variable length data format from a host, storing the first data and sending the first data over an I/O channel for data in the variable length data format, a second storage system for receiving the first data from the first storage system, converting the first data from the first storage system to second data in a fixed block data format and sending the second data over an I/O channel for data in the fixed block data format, and a third storage system for receiving the second data from the second storage system, converting the second data from the second storage system back to the first data and storing the first data.

20 Claims, 14 Drawing Sheets

OTHER PUBLICATIONS

"Working Draft American National Standard" Information Technology SCSI Block Commands—2 (SBC-2), May 31, 2003, Project T10/1417-D, pp. 1-145.

"EMC Symmetrix Remote Data Facility—Enterprise Storage Software Product Description Guide", EMC Corporation, Jun. 2000, p. 1-36.

"Remote Disk Mirroring With Fibre Channel over IP From CNT and EMC" Computer Network Technology Corp., Sep. 2001.

"EMC News release—EMC Infrastructure Software delivers Unbridled Data Movement, Central Management", EMC Corporation, Apr. 25, 2000.

* cited by examiner

HIGH SPEED DATA TRANSFER BETWEEN MAINFRAME STORAGE SYSTEMS This application is a continuation-in-part of U.S. patent application Ser. No. 09/774,435 filed Jan. 30, 2001 now U.S. Pat. No. 6,748,467, entitled HIGH SPEED DATA TRANSFER BETWEEN MAINFRAME STORAGE SYSTEMS, published as U.S. Patent application Pub. No. 2002/0112079A1 on Aug. 15, 2002, the contents of which are fully incorporated herein by reference.

BACKGROUND OF THE INVENTION

1. Field of the Invention

This invention relates generally to computer systems, and more particularly to methods and associated systems for transferring data between storage systems.

2. Description of the Background Art

For back-up purposes, data stored in a disk unit of a local mainframe computer system are copied to a remote storage device to prevent data loss in the event of a disaster such as a disk crash or facility shutdown. U.S. Pat. No. 6,098,129 to Fukuzawa et al. ("Fukuzawa") discloses a configuration for backing-up data from a mainframe computer system ("mainframe") to an open computer system. Although Fukuzawa discloses the use of low-cost open computer system storage devices for backing-up mainframe data, Fukuzawa does not disclose the use of another mainframe storage device for back-up.

Because mainframes are generally more reliable than other types of computer systems, data stored in the disk unit of a mainframe are ideally backed-up to a disk unit of another mainframe. Remote dual copy functions, which involve the backing-up of stored data from one computer system to another in real-time, have been performed between mainframes using the so-called Count-Key-Data ("CKD") protocol. The CKD protocol allows currently available mainframes to transfer data at a rate of approximately 17 MB/s (mega-bytes/second). To increase the amount of data that can be copied from one mainframe to another within a period of time, it is desirable to obtain a data transfer rate that is faster than what is currently obtainable using the CKD protocol.

SUMMARY OF THE INVENTION

The present invention relates to a method and associated systems for transferring data between mainframe storage devices. While the invention is suitable for remote dual copy functions, the invention may be generally used in applications requiring data transfers.

In one embodiment of the invention, a local disk system of a local mainframe includes one or more local disk units. For back-up purposes, data in at least one of the local disk units are copied to a designated remote disk unit of a remote disk system. Data transfer between the disk units of the local and remote disk systems occurs over a fixed block infrastructure to increase data transfer rates. Accordingly, variable-length data received in the local disk system and destined to be backed-up to the remote disk system are first converted to fixed-length data prior to transmission over the fixed block infrastructure. In the remote disk system, fixed-length data received over the fixed block infrastructure are converted back to variable-length data.

In one embodiment of the invention, a method for performing data transfer between a local disk system and a remote disk system includes the steps of receiving variable-length data in the local disk system, converting the variable-length data to fixed-length data, sending the fixed-length data to the remote disk system, and converting the fixed-length data back to variable-length data in the remote disk system. The use of fixed-length data in the just mentioned method increases the data transfer rate between the local and the remote disk systems.

These and other features and advantages of the present invention will be readily apparent to persons of ordinary skill in the art upon reading the entirety of this disclosure, which includes the accompanying drawings and claims.

BRIEF DESCRIPTION OF THE DRAWINGS

The use of the same reference number in different drawings indicates the same or like components.

DETAILED DESCRIPTION OF THE INVENTION

Figure 1:
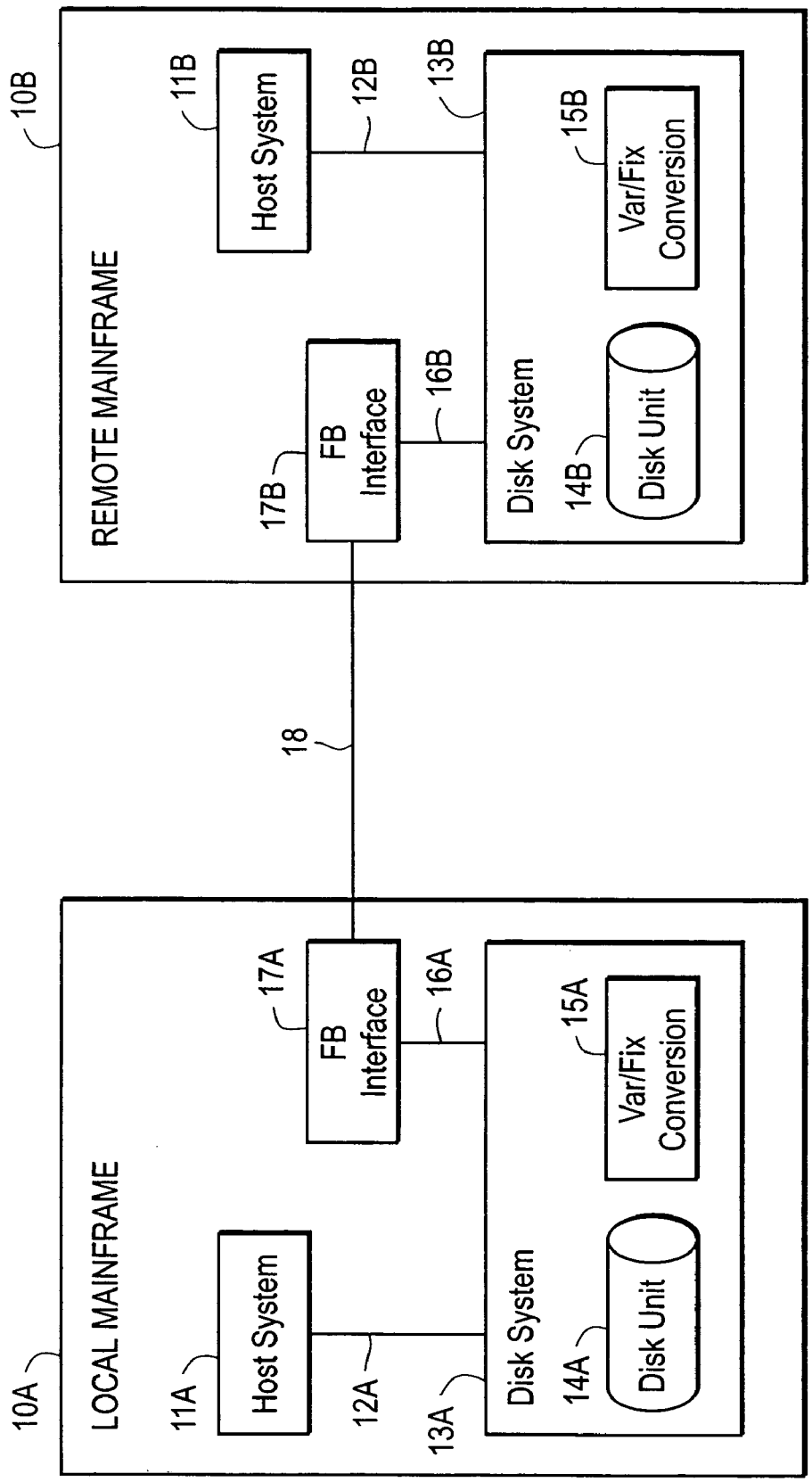
FIG. 1 shows a schematic diagram of a configuration for performing a remote dual copy function in an embodiment of the present invention.

Turning now to FIG. 1, there is shown a schematic diagram of a configuration for performing a remote dual copy function in accordance with an embodiment of the present invention. In a local mainframe 10A, data provided by a host system 11A are stored in a disk unit 14A of a disk system 13A. Host system 11A, which is the central processing unit of local mainframe 10A, conventionally reads from and writes to disk unit 14A using variable-length data commonly referred to as a "record". The well known Count-Key-Data ("CKD") protocol provides a format for representing variable-length data in a mainframe. In this embodiment, host system 11A provides variable-length data to disk system 13A via a CKD channel 12A.

In general, the control software overhead of protocols using variable-length data is higher than that of protocols using fixed-length data (also referred to as "fixed-length blocks" or "fixed blocks"). Thus, variable-length data protocols such as CKD are generally slower than fixed-length data protocols such as the Small Computer Systems Interface ("SCSI"). As a comparison, the data transfer rate of SCSI is 100 MB/s while that of CKD is only 17 MB/s. In the present invention, a fixed block channel 18 (e.g., SCSI channel) is employed to increase the data transfer rate between disk system 13A and disk system 13B. As shown in FIG. 1, disk system 13A includes a conversion function 15A for converting the variable-length data received from host system 11A to fixed-length data, which are then transported, along with a command for fixed-length data protocol such as a standard write command, over channel 18 via a fixed block interface 17A (e.g., SCSI interface). In remote mainframe 10B, a fixed block interface 17B receives the fixed-length data and command for fixed-length data protocol from fixed block interface 17A. The fixed-length data and command for fixed-length data protocol are provided to disk system 13B which responds to the command for fixed-length data protocol The disk system 13B includes a disk unit 14B for storage and a conversion function 15B for converting the fixed-length data back to variable-length data (and vice versa).

As is well known, a record stored in a disk unit of a mainframe is located by specifying a cylinder number, a head number, a sector number, and a record number. The cylinder number identifies a magnetic disk in the disk unit while the head number identifies a read/write head. The cylinder number and the head number, together, identify a track, which is a circular region on the magnetic disk where individual records are stored. Each track is further divided into fixed-angled regions commonly known as sectors. A sector provides the general location of a record on a track, and thus facilitates the searching of a record.

Figure 2:
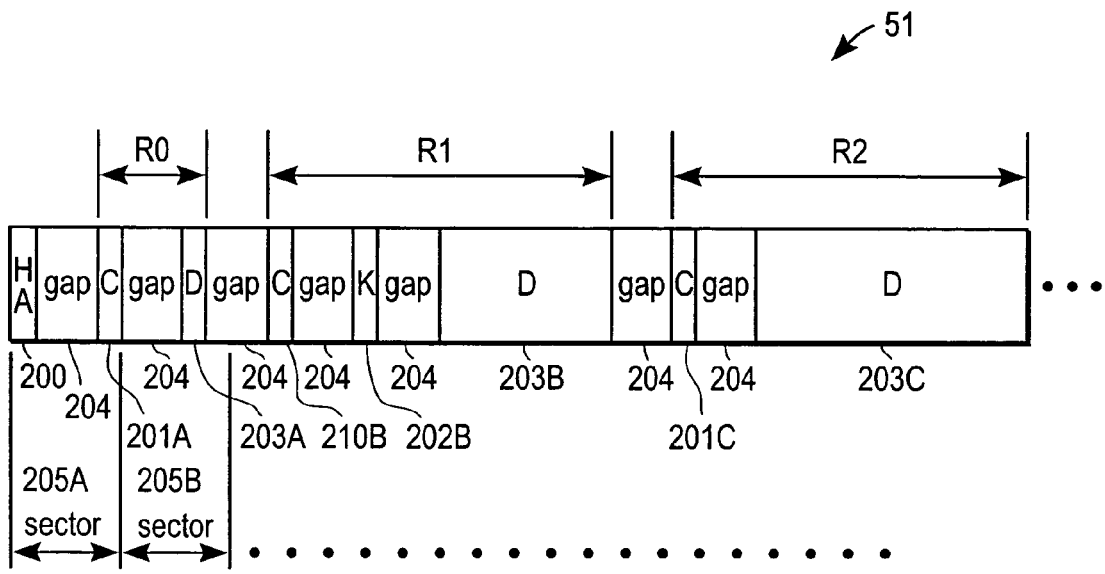
FIG. 2 illustrates the format of a track in Count-Key-Data (CKD) format.

FIG. 2 shows the format of a track 51 in CKD format. Track 51 includes a Home Address ("HA") 200, gaps 204, and records R0, R1, R2, etc. HA 200 is located at the beginning of track 51 and contains control information for accessing and identifying the track. As shown in FIG. 2, each field in track 51 is separated by a gap 204. HA 200 and gaps 204 have fixed lengths. Each record further includes a count field 201 (i.e., 201A, 201B . . . ), a key field 202 (i.e., 202B, . . . ), and a data field 203 (i.e., 203A, 203B, . . . ). Count field 201 has a fixed length and contains record control information such as the record number, the length of key field 202, and the length of data field 203. Key field 202 includes key information for accessing the user or system data stored in data field 203. When count field 201 indicates that the length of key field 202 is zero, the record does not include a key field. To locate a record, the record number indicated in count field 201 is checked because the record numbers are not necessarily consecutive. That is, record R1 does not necessarily follow record R0, record R2 does not necessarily follow record R1, and so on.

Figure 3:
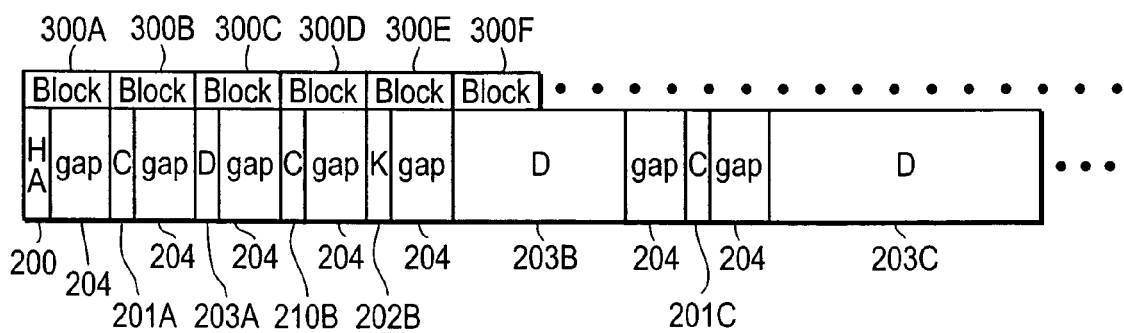
FIG. 3 illustrates the conversion of variable-length data to fixed-length data and vice versa in an embodiment of the present invention.

The conversion of variable-length data to fixed-length data, and vice versa, in accordance with an embodiment of the present invention is now described with reference to FIG. 3. As shown in FIG. 3, the contents of a track can be stored in a predetermined number of fixed-length blocks (i.e., fixed blocks) because the length of a track is fixed. Furthermore, the blocks that are in a sector 205 (i.e., 205A, 205B, . . . ) are readily identified because the length of a sector is also fixed. That is, the fixed blocks for a particular sector can be found knowing the position of the sector relative to HA 200, the number of blocks per sector, and the number of sectors per track. In the example of FIG. 3, the contents of track 51 are stored in fixed blocks 300A, 300B, 300C, etc. Fixed block 300A is referred to as the "top block"

and includes the contents of HA 200. Thus, the track represented by a set of fixed blocks 300 can be identified by looking up the track number indicated in the HA 200 stored in a fixed block 300A. The fixed blocks following fixed block 300A are consecutively arranged to facilitate the conversion of the fixed blocks back into CKD format. That is, fixed block 300B follows fixed block 300A, fixed block 300C follows fixed block 300B, and so on. Thus, fixed blocks 300B, 300C, 300D, etc. can be consecutively arranged to recreate the CKD formatted data once the matching fixed block 300A is found.

As can be appreciated by persons of ordinary skill in the art reading the present disclosure, fixed blocks 300 are suitable for transportation using a fixed block protocol such as SCSI. For example, each fixed block 300 can be assigned a unique SCSI logical block address (LBA) because the number of fixed blocks in a track and the number of tracks in a disk unit are fixed. Thus, assuming that each track has 100 fixed blocks, an LBA of 3521 may be used to identify the 22nd block in the 35th track.

Figure 11A:
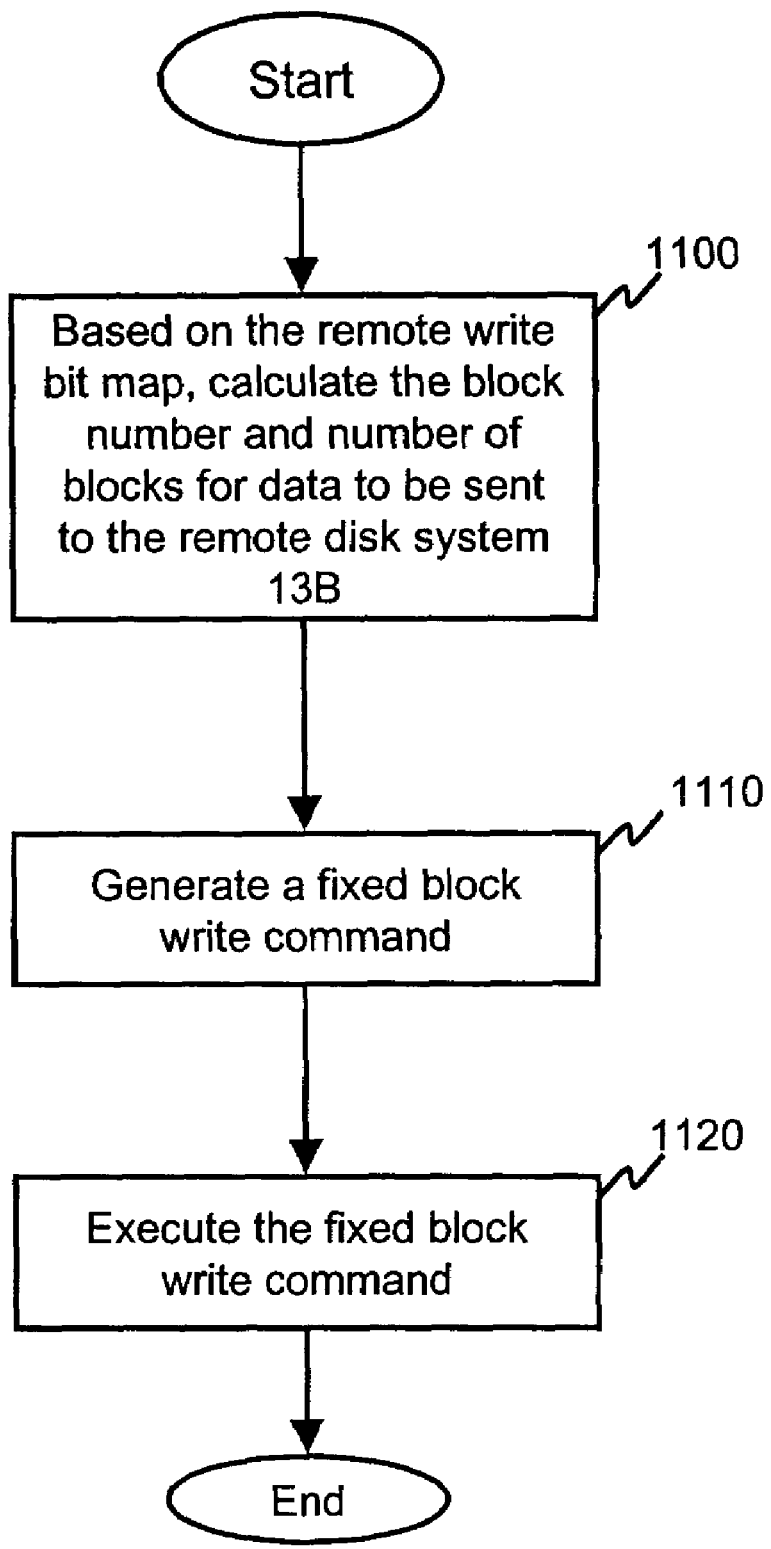
FIGS. 11A and 11B illustrate generating a write command for fixed-length data format from variable-length data.
Figure 11B:
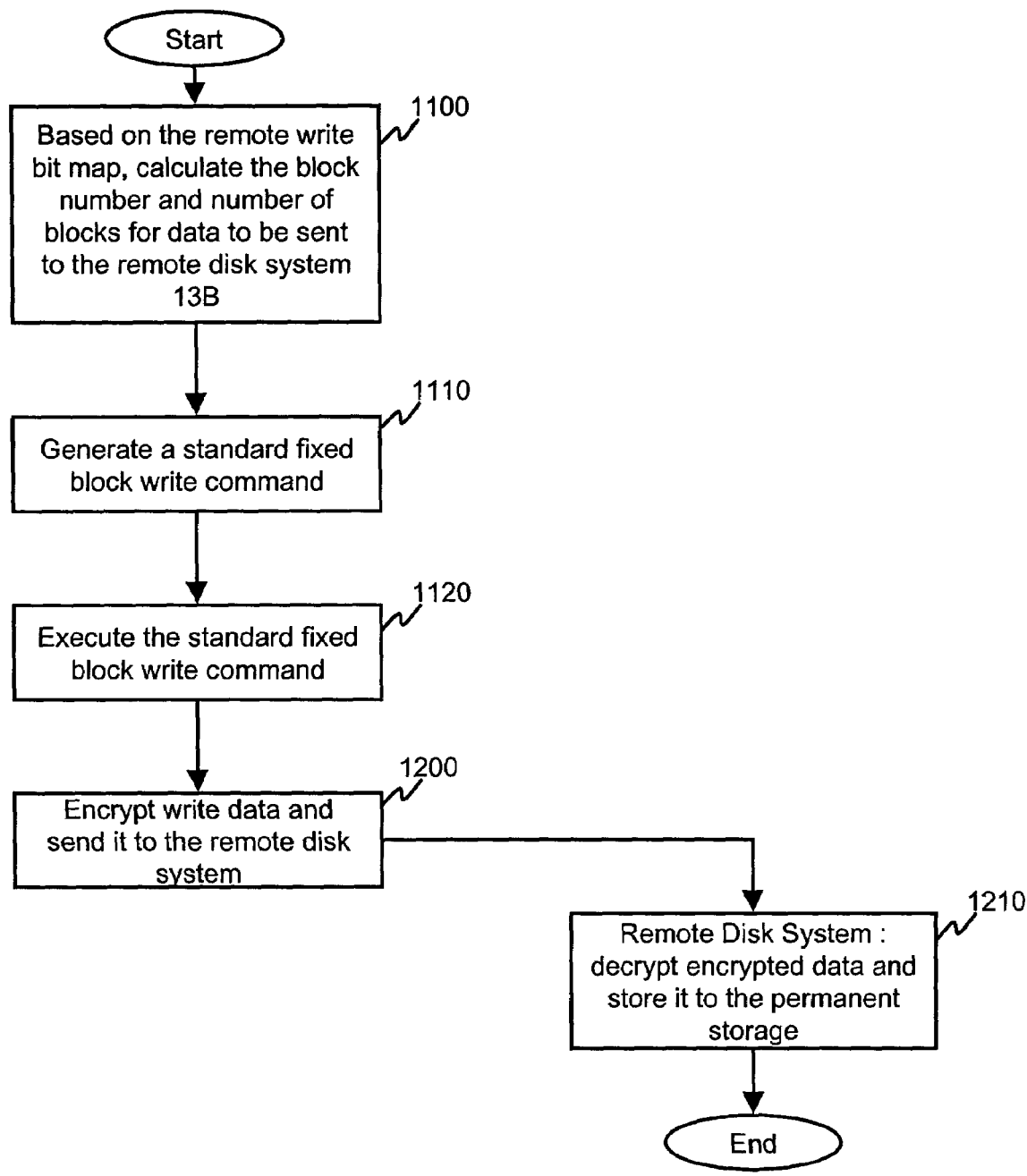

FIGS. 11A and 11B illustrates the steps to generate, for example, a standard write command for fixed-length data from variable-length data. The present invention assumes, but is not limited to, SCSI, Fiber Channel Protocol (FCP) and Internet SCSI (iSCSI) as a fixed-length data transfer protocol, and Enterprise Systems Connection (ESCON) and Fiber Connectivity (FICON) as variable-length data transfer protocol. iSCSI is an Internet Protocol (IP) based storage networking standard for linking data storage facilities as developed by the Internet Engineering Task Force (IETF). By carrying SCSI commands over IP networks, iSCSI is used to facilitate data transfers over intranets and to manage storage over long distances. ECSON is the name for a set of apparatus and software that interconnect mainframe computers with each other and with attached storage, workstations or other devices. FICON is a high-speed input/output (I/O) interface for mainframe computer connections to storage devices using ESCON over a fiber optic channel.

A "standard" write command as used herein means that any device compliant to the protocol corresponding to the "standard" can perform the write command. Thus, in this regard, the present invention does not use any special (or proprietary) fixed-length command in order to send and receive variable-length data.

Figure 6:
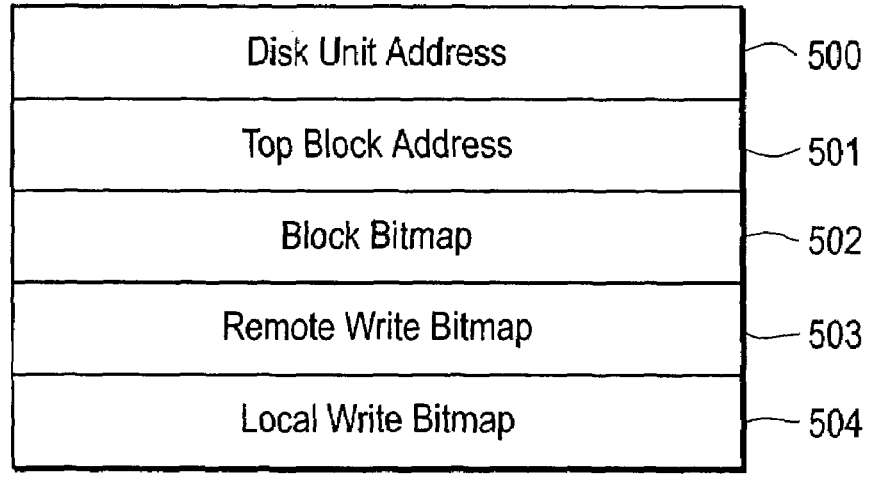
FIG. 6 illustrates the structure of a segment control block in an embodiment of the present invention.

Step 1100 of FIG. 11A is a step to calculate the block number and the number of blocks of data to be sent. In order to accomplish such, a Remote Write Bit Map 503 of segment control block 118A as shown in FIG. 6 is referenced. A complete description of the segment control block 118A is provided below. The Remote Write Bit Map 503 indicates, by the bits included therein, data to be sent to the remote disk system 13B. According to the present invention, each bit of the Remote Write Bit Map 503 corresponds to a (fixed) block of a segment 116A of cache memory 113A of the local mainframe system 100, which will be described in more detail below. Consecutive bits in Remote Write Bit Map 503 indicate blocks in the segment 116A are consecutive, and any consecutive blocks can be sent with one fixed-length-block write command.

Since all blocks are uniquely numbered in a disk unit 14A, it is now easy to find out the starting block number and the number of blocks of data to be transferred to the remote disk system 13B, the steps of which include: (a) Find a bit in the Remote Write Bit Map 503 that has no preceding bit, (b) set the block corresponding to the bit having no preceding bit as the starting block, and (c) set the succeeding number of consecutive bits starting from the first bit as the number of blocks.

Step 1110 of FIG. 11A is a step to generate a fixed-block write command based on the calculations performed in Step 1100. The fixed-block write command as generated may or may not be a standard command such as a SCSI write command. However, using SCSI as typical fixed-length block architecture, according to Working Draft American National Standard, rev 9, 31 May 2003, section 5.2.30, pp 72, the write command requires the following parameters: (a) Operation code (0Ah), (b) Logical block address, and (c) Transfer length. Thus, using SCSI as the protocol, Step 1110 sets the first block number to (b) Logical block address, and the number of blocks to (c) Transfer Length. Once the write command has been generated, the write command can be executed as per step 1120. If a special process or parameter is necessary, then such a fixed-block write command may be different from (standard) SCSI write command.

In iSCSI architecture, SCSI protocols are performed on TCP/IP network infrastructure. Because TCP/IP networks are very common and sometimes deployed in public networks, secure data transfer is sometimes required. In order to address this issue, the present invention provides for the possible encryption/decryption of data as noted in FIG. 11B. As illustrated in FIG. 11B, Steps 1100–1120 are the same as in FIG. 11A, with the exception of steps 1200 and 1210. Thereafter, to Step 1200 the write data, the fixed-length data blocks, are encrypted and sent by the local disk system 13A to the remote disk system 13B. According to Step 1210, the remote disk system 13B decrypts the encrypted write data and stores it to the disk unit 14B.

There are two options for implementing the above described encryption: (a) encrypt/decrypt both SCSI command and write data, or (b) encrypt/decrypt only write data. This encryption of present invention can be implemented using any known encryption/decryption algorithm for communication such as Shared Key Encryption, Public Key Encryption, etc.

It should be noted that according to the present invention the features of the fixed block interface 17A and 17B and the conversion function 15A and 15B can be provided by way of software and/or hardware which need not form a part of the local or remote disk systems 13A or 13B. Thus, according to the present invention, for example, the features of the present invention can be implemented in an existing disk system 13A or 13B by reconfiguring the disk system to include an FB interface implemented by way of an integrated circuit board and a conversion function by software installed so as to be executed by the processor of the disk system. Many other combinations and/or configurations which would become know to one of ordinary skill in the art upon review the present disclosure are possible and such configurations fall within the scope of the present invention.

Figure 4:
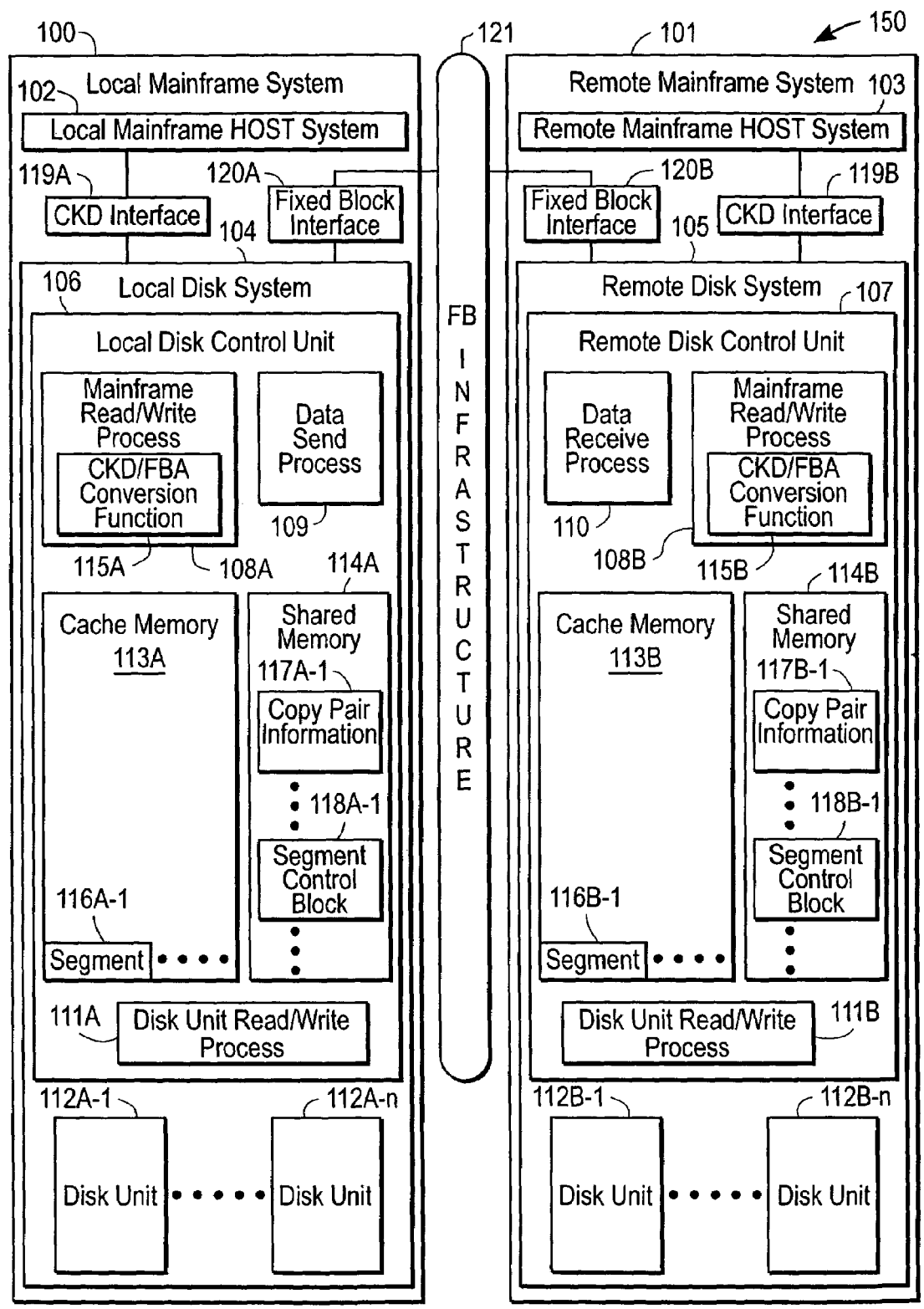
FIG. 4 shows a schematic diagram of a configuration for performing a remote dual copy function in another embodiment of the present invention.

FIG. 4 shows a schematic diagram of a configuration 150 for performing a remote dual copy function in another embodiment of the present invention. As shown in FIG. 4, a local host system 102, which is the central processing unit of a local mainframe 100, provides CKD formatted data to a local disk system 104 via a CKD interface 119A. Local disk system 104 further includes disk units 112A (i.e., 112A-1, 112A-2, ...) where data are stored, and a local disk control unit 106 for controlling disk units 112A.

Local disk control unit 106 includes a cache memory 113A where data that are in transit or frequently accessed are temporarily stored before being written to a disk unit 112A. Data in cache memory 113A are organized in segments (i.e., segments 116A-1, 116A-2, ...), with each segment having enough space to hold the entire contents of a single track.

Local disk control unit 106 also includes a mainframe read/write process 108A for processing disk read and write commands received from local host system 102, a data send process 109 for sending data to remote mainframe 101, and a disk unit read/write process 111A for transferring data between disk units 112A and cache memory 113A. In this disclosure, the term "process" includes hardware, software, and/or firmware for performing the indicated function. All of the just mentioned processes can access a shared memory 114A, which contains multiple copy pair information 117A (i.e., 117A-1, 117A-2, ...) and segment control blocks 118A (i.e., 118A-1, 118A-2, ...). A CKD/FBA conversion function 115A, which is generally available to all processes of local disk control unit 106, is called by read/write process 108A to convert CKD formatted data to fixed blocks and vice versa. In one embodiment, CKD/FBA conversion function 115A employs the technique described in connection with FIG. 3.

Figure 5:
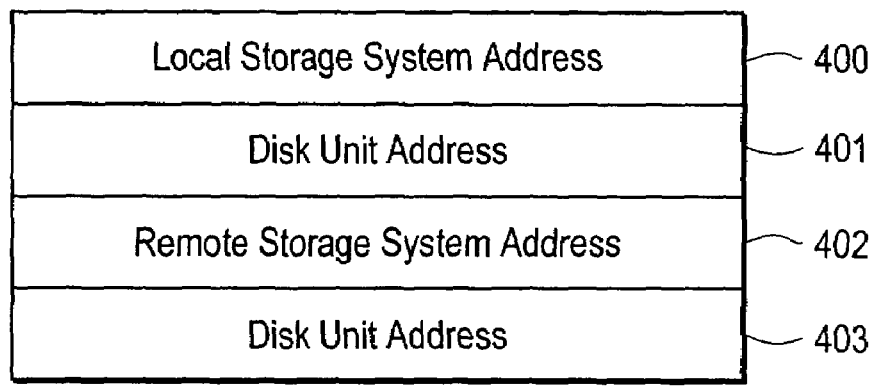
FIG. 5 illustrates the structure of a copy pair information in an embodiment of the present invention.

A copy pair information 117A identifies a disk unit in remote mainframe 101 that is designated as a back-up of a disk unit in local mainframe 100. FIG. 5 shows the structure of a copy pair information 117A. Referring to FIG. 5, a local storage system address 400 specifies a local disk system in local mainframe 100 (e.g., local disk system 104). A disk unit address 401 specifies a disk unit in the local disk system. Similarly, a remote storage system address 402 and a disk unit address 403 specify a remote disk system in remote mainframe 101 (e.g., remote disk system 105) and a disk unit in the remote disk system, respectively. The contents of the disk unit specified in disk unit address 401 are copied to the disk unit specified in disk unit address 403 during a remote dual copy function.

In configuration 150 shown in FIG. 4, each segment control block 118A contains information relating to a corresponding segment 116A stored in cache memory 113A. FIG. 6 shows the structure of a segment control block 118A in configuration 150. A disk unit address 500 specifies a disk unit 112A where storage space is allocated for the segment 116A. As mentioned, a segment 116A has enough space to hold the entire contents of the allocated track. If cache memory 113A is organized in terms of fixed blocks, as is the case in configuration 150, a segment 116A has enough space to hold all the fixed blocks of a track. A top block address 501 indicates the top block address of the track for which a segment 116A is allocated, and can thus be used to locate the segment 116A.

As shown in FIG. 6, a segment control block 118A also includes a block bitmap 502, a remote write bitmap 503, and a local write bitmap 504. Each bit of bitmaps 502, 503, and 504 corresponds to a block of the segment 116A identified by top block address 501. Accordingly, the number of bits of each of the just mentioned bitmaps is equal to the number of blocks in a segment 116A. Each bit of block bitmap 502 indicates whether the corresponding block is in cache memory 113A; i.e., when a bit of block bitmap 502 is ON, the block which corresponds to that bit is in a segment 116A in cache memory 113A. The bits of remote write bitmap 503 indicate whether the corresponding blocks need to be written to a disk unit in remote disk system 105. That is, when a bit of remote write bitmap 503 is ON, the block which corresponds to that bit is to be transmitted to remote disk system 105 of remote mainframe 101. Similarly, each bit of local write bitmap 504 indicates whether the corresponding block needs to be written to a disk unit of local disk system 104.

Referring to FIG. 4, a fixed block interface 120A transports fixed blocks to remote mainframe 101 over a fixed block infrastructure 121. In one embodiment, interface 120A is a SCSI interface, and infrastructure 121 is a SCSI infrastructure that includes SCSI cables, line drivers, adapters, repeaters, etc. To process the fixed blocks received over infrastructure 121, remote disk system 105 includes components that mirror those of local disk system 104. That is, remote disk system 105 also has a data receive process, a mainframe read/write process, a CKD/FBA conversion function, a cache memory, a shared memory, a disk unit read write process, and a CKD interface that are similar to those in remote disk system 105. In the present disclosure (including in FIG. 4), the same or like components are labeled with the same reference numeral. For example, shared memory 114A of local disk system 104 is similar to shared memory 114B of remote disk system 105.

Figure 7A:
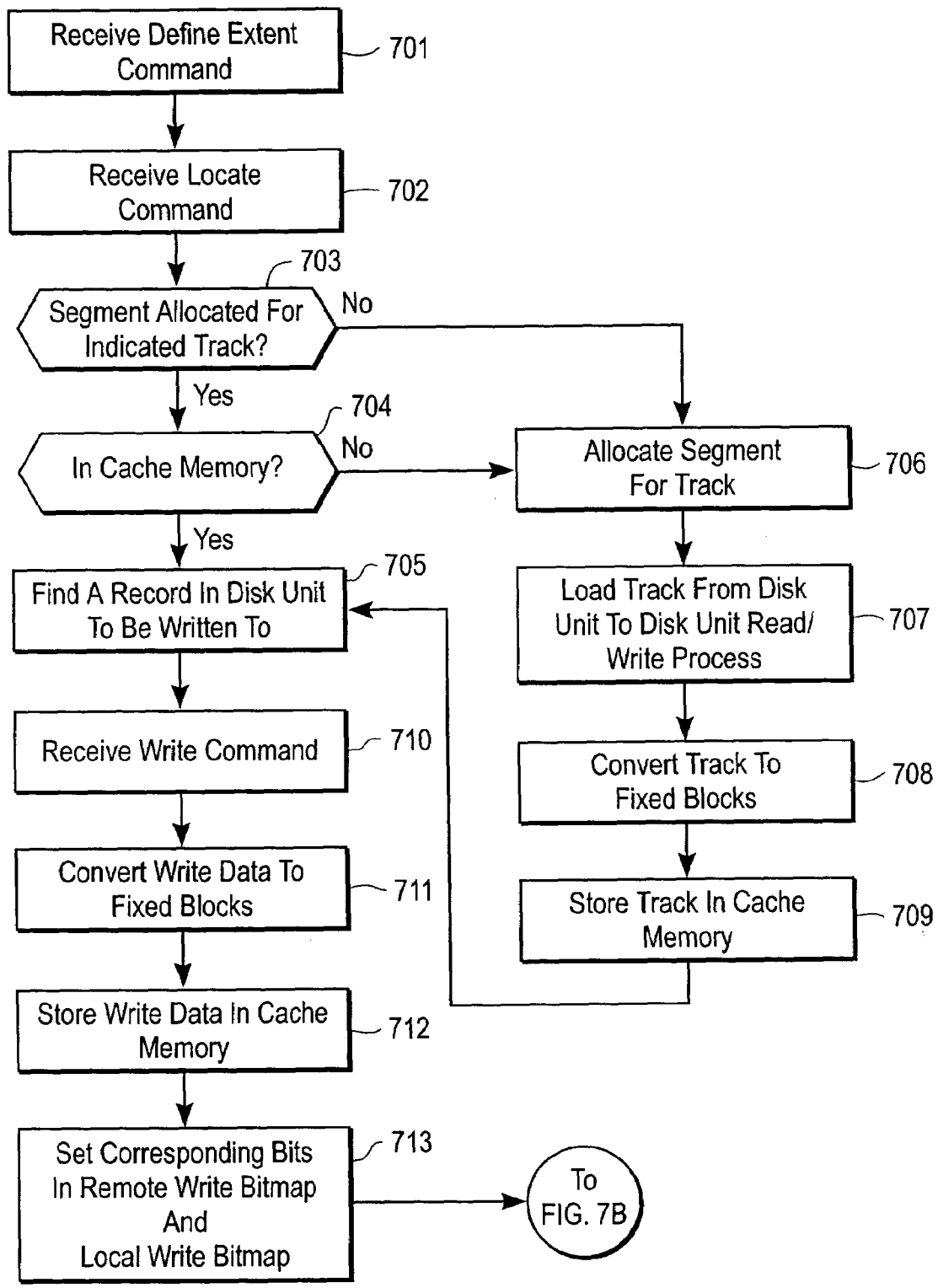
FIGS. 7A and 7B show a method for performing a remote dual copy function in an embodiment of the present invention.

A method for performing a remote dual copy function in accordance with an embodiment of the present invention is now described with reference to FIG. 7A, FIG. 7B, and FIG. 4. Referring to FIG. 7A, a remote dual copy function is initiated when read/write process 108A receives a Define Extent command from local host system 102 (step 701). As is conventional, the Define Extent command includes information for processing forthcoming Locate and Read/Write commands such as cache memory utilization mode etc. After receiving the Define Extent command, read/write process 108A then receives a Locate Command (step 702). As is conventional, the Locate command specifies a record to access by providing a cylinder number, a head number, a sector number, and a record number. The cylinder number and the head number, together, identify a particular track in a disk unit. To determine if there is a segment 116A allocated for the track specified in the Locate command, read/write process 108A checks the top block addresses 501 of the segment control blocks 118A (step 703). Note that read/write process 108A may utilize CKD/FBA conversion function 115A to convert CKD formatted data to fixed blocks and vice versa.

If a segment 116A is allocated for the track, read/write process 108A checks the block bitmap 502 of the corresponding segment control block 118A to determine if fixed blocks belonging to the sector specified in the Locate command are in cache memory 113A (step 704).

If the blocks corresponding to the sector number are not in cache memory 113A or if a segment 116A is not allocated for the track specified in the Locate Command, a segment 116A and corresponding segment control block 118A are created for the track (step 706). Thereafter, the contents of the track are loaded from the disk unit 112A specified in the Locate command to disk unit read/write process 111A (step 707), converted to fixed blocks (step 708), and then stored in cache memory 113A in the allocated segment 116A (step 709).

Once it is established that the contents of the track are in cache memory 113A, read/write process 108A finds a record in a disk unit 112A where write data from a forthcoming Write command is to be written (step 705). Subsequently, read/write process 108A receives the Write command that goes with the previously received Define Extent and Locate commands (step 710). Read/write process 108 converts the write data that accompany the write command from CKD format to fixed blocks (step 711), stores the converted write data to cache memory (step 712), and then sets the corresponding bits in remote write bitmap 503 and local write bitmap 504 (step 713). At a later time, disk unit read/write process 111A conventionally writes the fixed blocks identified in local write bitmap 504 to their respective disk units 112A.

Figure 7B:
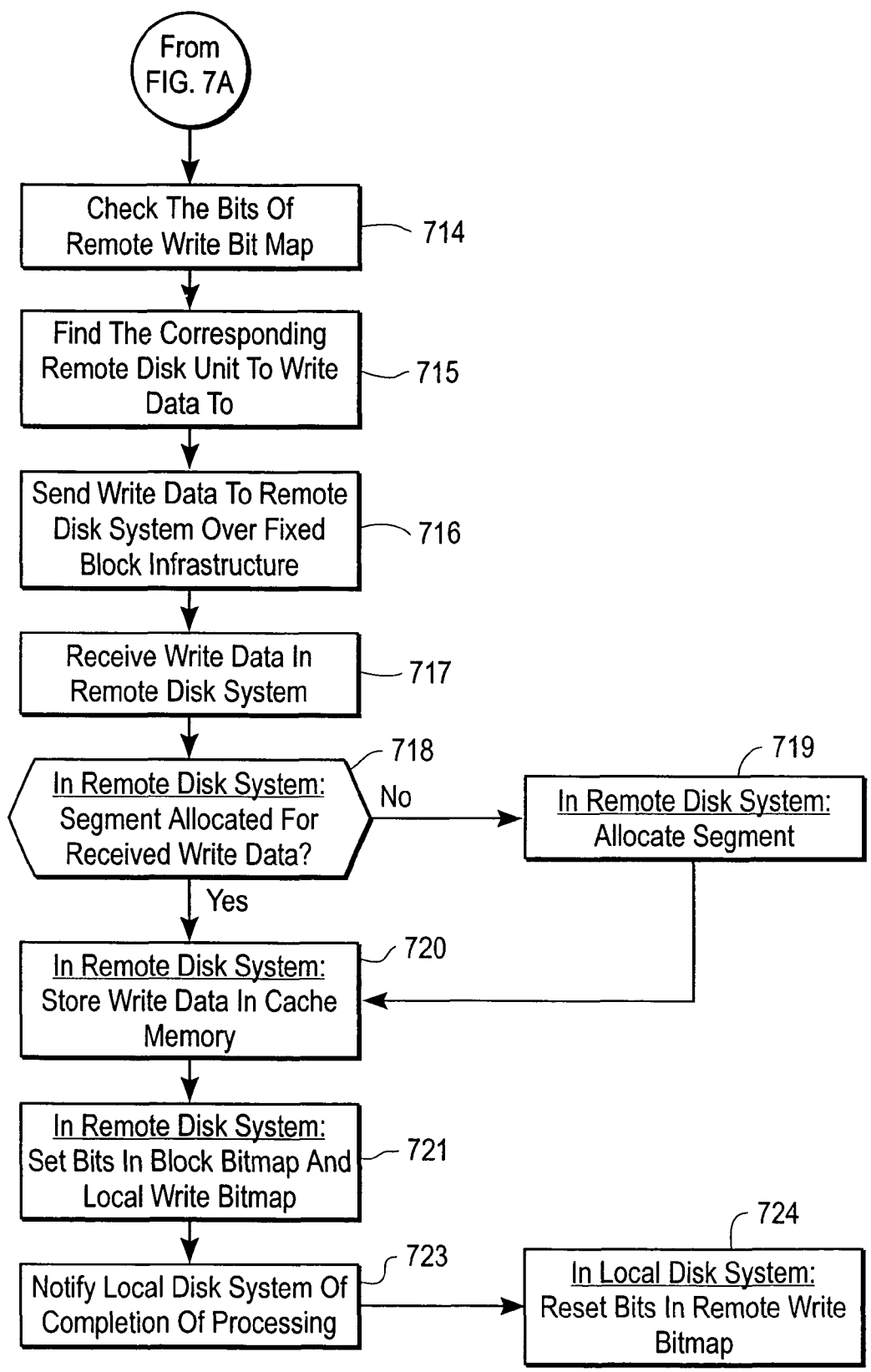

Continuing with step 714 shown in FIG. 7B, data send process 109 checks the bits of the remote write bitmaps 503 in shared memory 114A to find the fixed blocks that need to be sent to remote disk system 105. Data send process 109 uses the information in a copy pair information 117A to determine the remote disk unit designated to receive the fixed blocks (step 715). Data send process 109 sends the fixed blocks to remote disk system 105 via fixed block interface 120A and over fixed block infrastructure 121 (step 716). Because fixed block interface 120A, fixed block interface 120B, and infrastructure 121 are based on SCSI in this embodiment, each fixed block is assigned a unique logical block address.

In remote disk system 105, a data receive process 110 receives the fixed blocks via a fixed block interface 120B (step 717). Data receive process 110 then checks the top block addresses of segment control blocks 118B to determine if there is a segment 116B allocated for each received fixed block (step 718). If a segment 116B is not allocated, a segment 116B and a corresponding segment control block 118B are created for the fixed block (step 719). Data receive process 110 then stores the fixed blocks in their respective segments 116B (step 720). Thereafter, data receive process 110 sets the corresponding bits in the block bitmap and local write bitmap of the segment control block 118B (step 721), and notifies data send process 109 that the fixed blocks have been received and processed in remote disk system 105 (step 723). In response, data send process 109 resets the corresponding bits in the remote write bitmap 503 in local disk system 104. At a later time, disk unit read/write process 111B in remote disk system 105 conventionally writes the fixed blocks identified in the local write bitmap of the segment control block 118B to their respective disk units 112B.

Figure 8A:
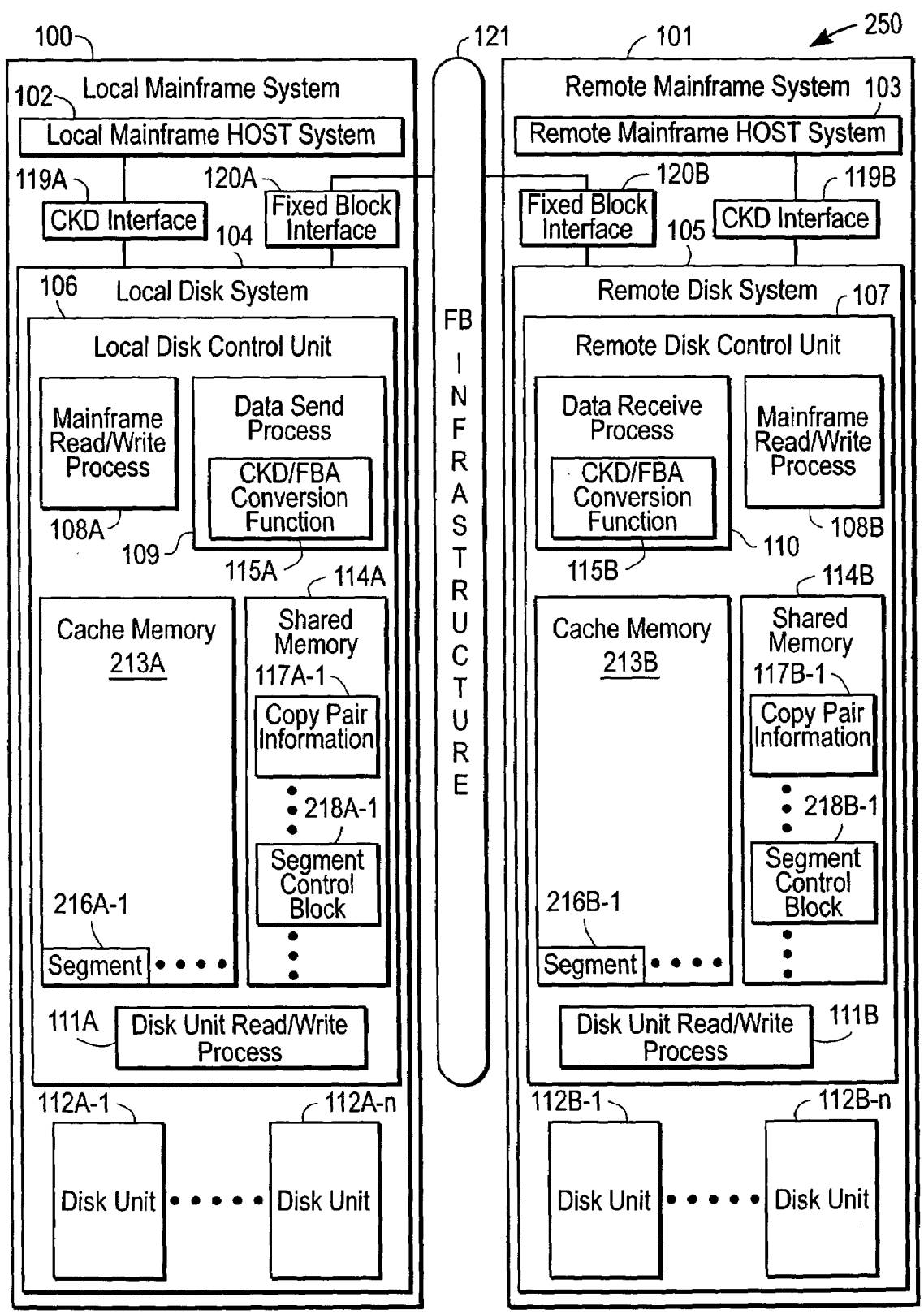
FIG. 8A shows a schematic diagram of a configuration for performing a remote dual copy function in another embodiment of the present invention.

FIG. 8A shows a schematic diagram of a configuration 250 for performing a remote dual copy function in another embodiment. In contrast to configuration 150, cache memory 213 (i.e., 213A, 213B), segment 216 (i.e., 216A, 216B), and segment control block 218 (i.e., 218A, 218B) of the mainframes in configuration 250 are configured to process CKD formatted data. That is, each segment 216 of a cache memory 213 has enough space to hold the records of a single track in CKD format.

Figure 8B:
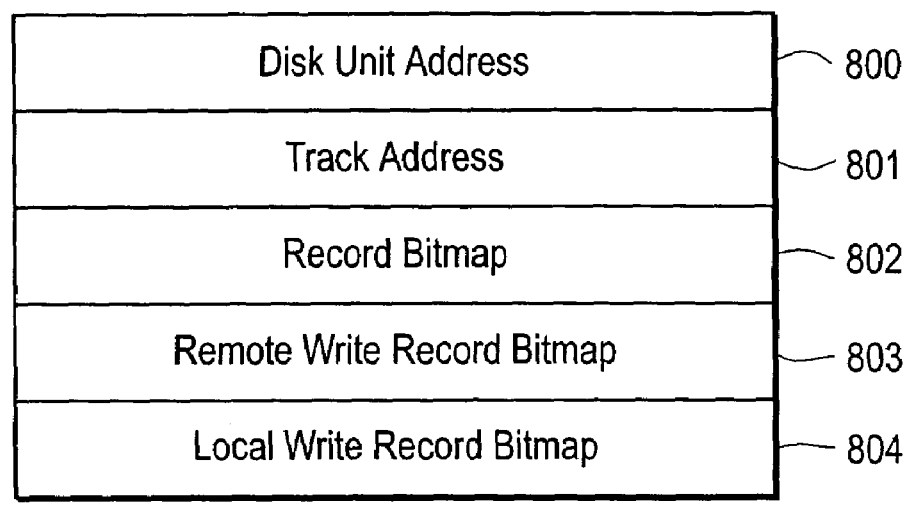
FIG. 8B illustrates the structure of a segment control block in another embodiment of the present invention.

In configuration 250, each segment 216 has a corresponding segment control block 218. FIG. 8B shows the structure of a segment control block 218 in configuration 250. As shown in FIG. 8B, a disk unit address 800 specifies a disk unit 112 where storage space is allocated for the segment 216. A track address 801 contains the address of the track allocated for the segment 216.

A segment control block 218 further includes a record bitmap 802, a remote write record bitmap 803, and a local write record bitmap 804. Each bit of the just mentioned bitmaps corresponds to a record stored in the corresponding segment 216. Accordingly, the number of bits of each of the just mentioned bitmaps is equal to the maximum number of records in a track.

Record bitmap 802 indicates whether a record is in a segment 216. When a bit of record bitmap 802 is ON, the record that corresponds to that bit is in a corresponding segment 216.

Remote write record bitmap 803 indicates whether a record in the corresponding segment 216 needs to be written to a disk unit in the remote disk system (which is identified in a copy pair information 117 similar to that used in configuration 150). When a bit in remote write record bitmap 803 is on, the record that corresponds to that bit is transmitted to the remote disk system.

Local write record bitmap 804 indicates whether a record in the corresponding segment 216 needs to be written to a disk unit in the local disk system. When a bit of local write record bitmap 804 is on, the record that corresponds to that bit is written to a disk unit in the local disk system.

In configuration 250, CKD formatted data from local host system 102 are not converted to fixed blocks until the data are ready to be transmitted to remote disk system 105. Accordingly, data send process 109 calls CKD/FBA conversion function 115A to convert the CKD formatted data to fixed blocks before handing the data to fixed block interface 120A. In remote disk system 105, data receive process 110 calls CKD/FBA conversion function 115B to convert the fixed blocks received over fixed block infrastructure 121 back to CKD format.

Figure 9:
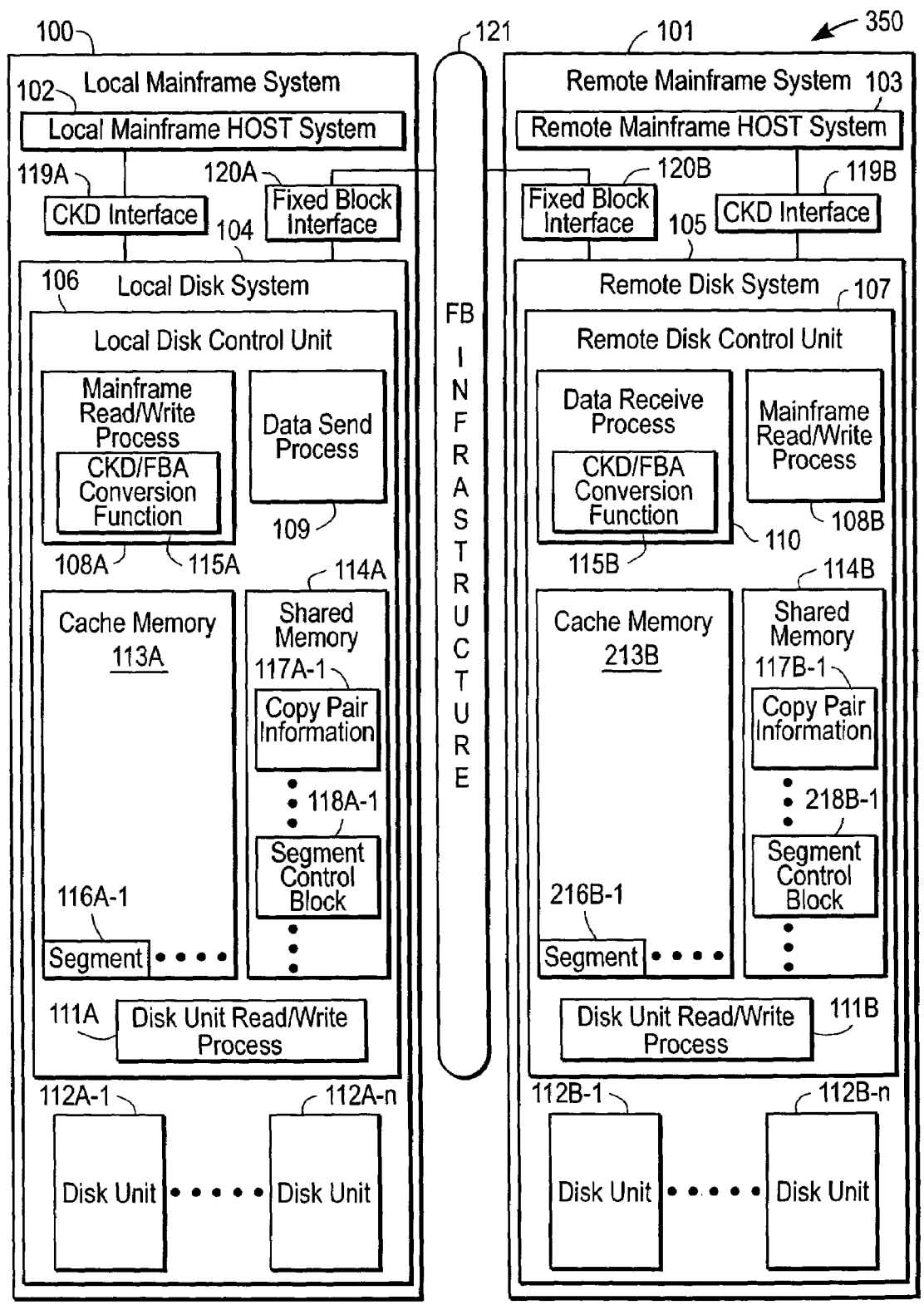
FIGS. 9 and 10 show schematic diagrams of configurations for performing a remote dual copy function in other embodiments of the present invention.
Figure 10:
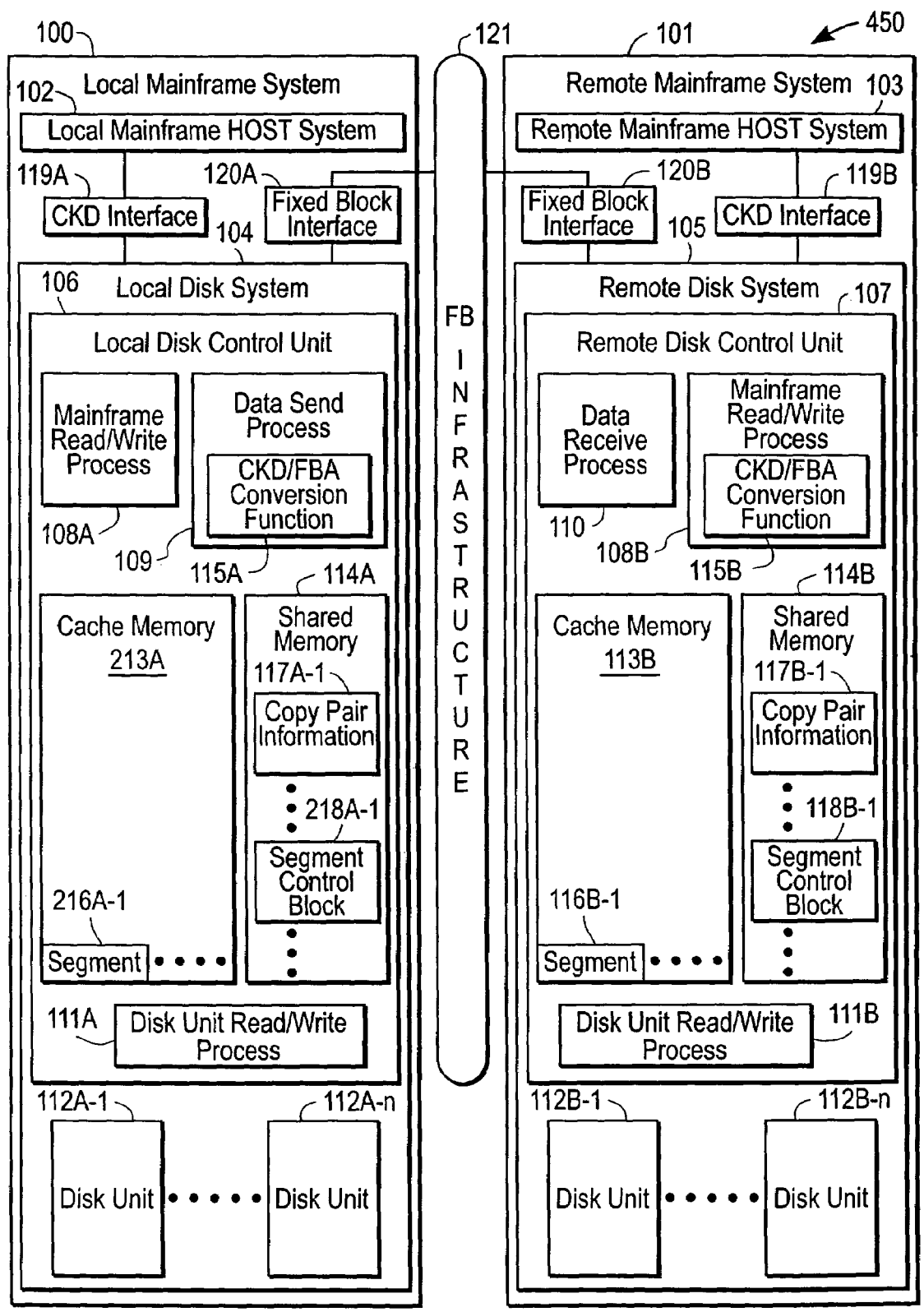

As is evident from the foregoing, configuration 250 and configuration 150 are similar except for the use of CKD formatted data in the cache memory of configuration 250. Persons of ordinary skill in the art will appreciate that the present invention can be employed regardless of the cache memory management scheme. For example, FIG. 9 shows a configuration 350 where the local disk system uses a fixed block cache management scheme similar to that used in the local disk system of configuration 150, whereas the remote disk system uses a CKD cache management scheme similar to that used in the remote disk system of configuration 250. Similarly, FIG. 10 shows a configuration 450 where the local disk system uses a CKD cache management scheme similar to that used in the local disk system of configuration 250, whereas the remote disk system uses a fixed block cache management scheme similar to that used in the remote disk system of configuration 150.

Figure 12A:
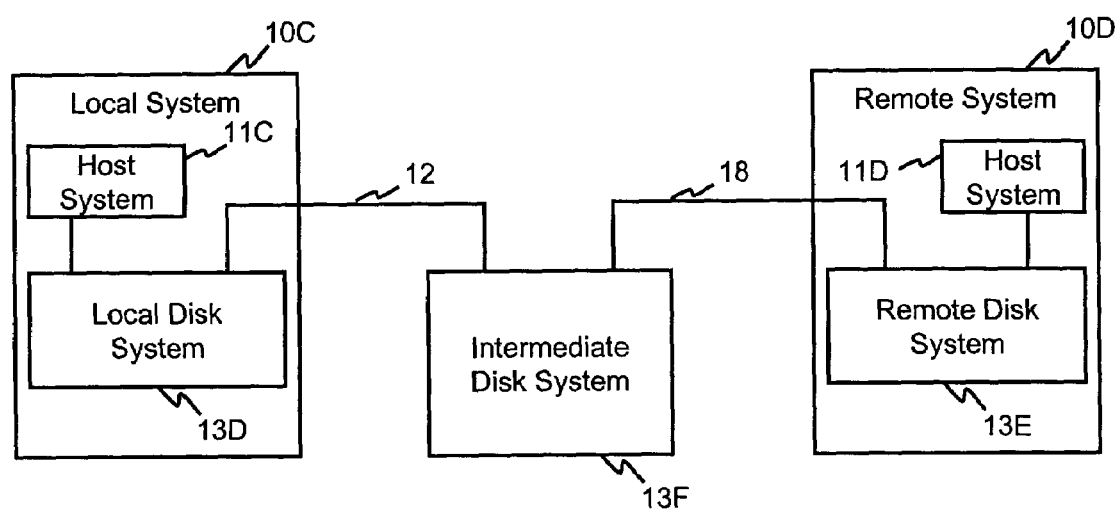
FIGS. 12A and 12B illustrate a multiple data center system in an embodiment of the present invention.

Some industries, such as bank, insurance and airline, are not tolerant for data lost even in case of disasters. In order to address this issue, a computing system such as that illustrated in FIG. 12A is provided according to the present invention. In this computing system, the Intermediate Disk System 13F is located between Local Disk System 13D and Remote Disk System 13E. Data written to Local Disk System 13D from Host System 11C is "synchronously" copied to the Intermediate Storage System 13F and then "asynchronously" copied from the Intermediate Storage System from the Local Disk System 130 to Remote Disk System 13E. The synchronous remote copy procedure is as follows:

(1) Write data is stored at local disk system 13D,
(2) The write date is transmitted from Local Disk System 13D to Intermediate Disk System 13F,
(3) Write completion notice is sent from Intermediate Disk System 13F to Local Disk System 13D, when the write data is stored in Intermediate Disk System 13F, and
(4) I/O completion notice is sent from Local Disk System 13A to Host System 11A.

The asynchronous remote copy means no receipt of write completion notice from the Remote Disk System 13E. Since the character of synchronous/asynchronous copy, Intermediate disk System 13F is located closely to Local Disk System 13D and far from Remote Disk System 13E. Data is never lost unless both Local Disk System 13D and Intermediate Disk System 13F are down.

According to the present invention as illustrated in FIG. 12A the link 12 between the local disk system 13D and the intermediate disk system 13F could, for example, be any of the above described variable data length protocols including ESCON, FICON, etc. Further, the link 18 between the intermediate disk system 13F and the remote disk system 13E could, for example, be any of the fixed-length data protocols as described above including SCSI, FCP, iSCSI, etc. The variable length data protocol such as ESCON is provided so as to allow for transmission of data from the local disk system 13B to the intermediate disk system 13F over short distances. The fixed-length data protocol such as provided SCSI is so as to allow for transmission of data from the intermediate disk system 13F to the remote disk system 13E over long distances. iSCSI is provided, for example, over the link 18 between the intermediate disk system 13F and the remote disk system 13E so as to permit the encryption of data and/or commands transmitted over the link.

Nearly ten years have passed since Remote Copy system was initially introduced. The first system used ESCON links to connect two disk systems, and such old infrastructures still exist. Users of such systems may want to continue use of these existing assets because of cost effectiveness. In order to address these issues, a computing system such as that illustrated in FIG. 12B is provided according to the present invention.

In this computing system combinations of infrastructures for fixed-block interface and variable-length interface are provided. In FIG. 12B, interface between Local Disk System 13A and Intermediate Disk System 13C is, for example, provided by ESCON (variable-length interface), and an interface between Intermediate Disk System 13C and Remote Disk System 13B is, for example, provided by FCP (fixed-length interface).

Figure 12B:
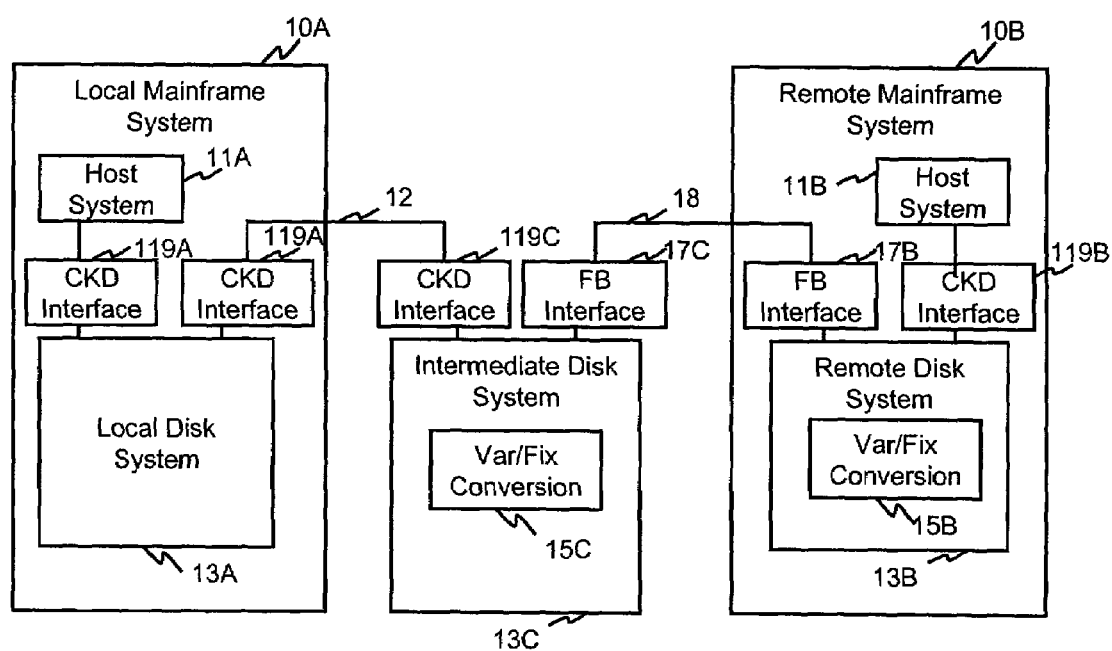

In the computing system configuration illustrated in FIG. 12B, data written to Local Disk System 13A from Host System 11A may be "synchronously" copied from Local Disk 13A to Intermediate Disk System 13C and then "asynchronously" copied from intermediate disk system 13C to Remote Disk System 13B. Data transfer between Local Disk System 13A and Intermediate Disk System 13C can also be done by using a method described in U.S. Pat. No. 5,155,845.

Intermediate Disk System 13C and Remote Disk System 13B act like Local Disk System 104 and Remote Disk System 105 respectively shown in either one of FIG. 4, FIG. 8A, FIG. 9 or FIG. 10. In other words, Intermediate Disk System 13C performs the steps shown in either one of FIGS. 7A and 7B or FIGS. 11A and 11B, in order to send variable-length data from Local Disk System 13A to Remote disk System 13B using fixed-block protocol.

There are other possible combinations of remote links and interface protocols between Local Disk System 13A, Intermediate Disk System 13C and Remote Disk System 13B and examples of such combinations are as follows:

(1) Fixed-block interface between Local Disk System 13A and Intermediate Disk System 13C, and between Intermediate Disk System 13C and Remote Disk System 13B, and
(2) Fixed-block interface between Local Disk System 13A and Intermediate Disk System 13C, and variable-length interface between Intermediate Disk System 13C and Remote Disk System 13B.

A method and associated systems for transferring data between storage systems for mainframe computers have been disclosed. While specific embodiments have been provided, it is to be understood that these embodiments are for illustration purposes and not limiting. Many additional embodiments will be apparent to persons of ordinary skill in the art reading this disclosure. For example, while the invention is suitable for use in remote dual copy functions, the invention is not so limited and may be generally used in applications requiring data transfer between storage systems. Thus, the present invention is limited only by the following claims.

What is claimed is:

1. A data copy method between a first storage system, a second storage system and a third storage system, the method comprising steps of:

receiving at the first storage system first data in variable-length data format from a host;

storing at the first storage system the first data;

sending the first data to the second storage system over an I/O channel for data in the variable-length data format;

converting at the second storage system the first data from the first storage system to second data in fixed block data format;

sending the second data to the third storage system over an I/O channel for data in the fixed block data format;

converting at the third storage system the second data from the second storage system back to the first data; and storing at the third storage system the first data.

2. A data copy method of claim 1, wherein the variable-length data format is Count-key-Data format, and wherein the fixed block data format is SCSI format.

3. A data copy method according to claim 1, wherein the first data in the variable length data format is converted to the second data in the fixed block data format by organizing the first data in the variable-length data format into a predetermined number of fixed blocks.

4. A data copy method according to claim 1, further comprising:

storing in one or more disk units at the second storage system the first data in the variable-length data format received from the first storage system.

5. A data copy method according to claim 1, further comprising:

storing the first data from the first storage system in a cache memory in the second storage system prior to converting the first data to the second data in the fixed block data format.

6. A data copy method according to claim 1, wherein the second data is encrypted prior to sending from the second storage system to the third storage system.

7. A data copy method according to claim 6, further comprising:

decrypting in the third storage system the encrypted second data from the second storage system prior to converting the second data in the fixed block data format back to the first data in the variable-length data format.

8. A data copy method according to claim 1, further comprising:

storing the first data converted from the second data received from the second storage system in a cache memory at the third storage system.

9. A system for transferring data between storage systems, comprising:

a first storage system, said first storage system including a first control unit and one or more first disk units, said control unit controlling I/O operations for said one or more first disk units, said first storage system configured for receiving first data in a variable length data format from a host, storing the first data in said one or more first disk units, and sending the first data over an I/O channel for data in the variable length data format;

a second storage system for receiving the first data from the first storage system, converting the first data from the first storage system to second data in a fixed block data format and sending the second data over an I/O channel for data in the fixed block data format; and a third storage system, said third storage system including a second control unit and one or more second disk units, said second control unit controlling I/O operations for said one or more second disk units, said third storage system configured for receiving the second data from the second storage system, converting the second data in the fixed block data format received from the second storage system back to the first data in the variable length data format, and storing the first data.

10. A system for transferring data between storage systems according to claim 9, wherein the variable length data format is count-key-data format, and wherein the fixed block data format is SCSI format.

11. A system for transferring data between storage systems according to claim 9, wherein said second storage system converts the first data in the variable length data format to the second data in the fixed block data format by organizing the first data in the variable length data format into a predetermined number of fixed blocks.

12. A system for transferring data between storage systems according to claim 9, wherein said second storage system stores the first data in the variable length data format received from the first storage system in one or more third disk units at the second storage system.

13. A system for transferring data between storage systems according to claim 9, wherein said second storage system stores the first data from the first storage system in a cache memory prior to converting the first data to the second data in the fixed block data format.

14. A system for transferring data between storage systems according to claim 9, wherein the second storage system encrypts the second data prior to sending.

15. A system for transferring data between storage systems according to claim 14, wherein said third storage system decrypts the encrypted second data from the second storage system prior to converting the second data in the fixed block data format back to the first data in the variable length data format.

16. A system for transferring data between storage systems according to claim 9, wherein the third storage system stores in a cache memory in said second control unit the first data in the variable length data format converted from the second data in the fixed block data format received from the second storage system.

17. A system for transferring data between storage systems, comprising:

a first storage system, said first storage system including a first control unit and one or more first disk units, said control unit controlling I/O operations for said one or more first disk units, said first storage system configured for receiving first data in a variable length data format from a host, storing the first data in said one or more first disk units, and sending the first data over an I/O channel for data in the variable length data format;

apparatus which can be configured for use in a second storage system for receiving the first data from the first storage system, converting the first data received from the first storage system to second data in a fixed block data format and sending the second data over an I/O channel for data in the fixed block data format; and a third storage system for receiving the second data from the apparatus, converting the second data from the apparatus back to the first data in the variable length data format, and storing the first data.

18. A system for transferring data between storage systems according to claim 17, wherein the variable length data format is count-key-data format, and wherein the fixed block data format is SCSI format.

19. A system for transferring data between storage systems according to claim 17, wherein said I/O channel between said apparatus and said third storage system is a SCSI I/O channel.

20. A system for transferring data between storage systems according to claim 17, wherein said I/O channel between said first storage system and said apparatus is a CKD I/O channel.

* * * * *